(12) United States Patent  
Taniuchi

(10) Patent No.: US 8,601,077 B2  
(45) Date of Patent: Dec. 3, 2013

(54) SERVER APPARATUS, MAIL SERVER APPARATUS AND FAX SERVER APPARATUS

(75) Inventor: Toshiyuki Taniuchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 243 days.

(21) Appl. No.: 13/228,645

(22) Filed: Sep. 9, 2011

(65) Prior Publication Data

US 2012/0066320 A1    Mar. 15, 2012

(30) Foreign Application Priority Data

Sep. 10, 2010   (JP) ................................ 2010-202937

(51) Int. Cl.  
*G06F 15/16*    (2006.01)

(52) U.S. Cl.  
USPC ................. 709/206; 709/223; 726/3

(58) Field of Classification Search  
USPC ......... 709/206, 203, 224, 223, 229; 726/3, 30  
See application file for complete search history.

(56) References Cited

U.S. PATENT DOCUMENTS

| | | | | |
|---|---|---|---|---|
| 7,681,037 B2 * | 3/2010 | Yoshida | .......................... | 713/168 |
| 8,117,644 B2 * | 2/2012 | Chaganti et al. | .................. | 726/2 |
| 2002/0123898 A1 * | 9/2002 | Lemay et al. | ..................... | 705/1 |
| 2003/0097418 A1 * | 5/2003 | Yajima | ............................ | 709/216 |
| 2009/0132597 A1 * | 5/2009 | Kawasaki | .................. | 707/104.1 |
| 2012/0291106 A1 * | 11/2012 | Sasaki | ................................ | 726/5 |

FOREIGN PATENT DOCUMENTS

| JP | 9-55839 A | 2/1997 |
|---|---|---|
| JP | 2001-111601 A | 4/2001 |
| JP | 2002-26962 A | 1/2002 |
| JP | 2004-13891 A | 1/2004 |
| JP | 2007-133475 A | 5/2007 |
| JP | 2010-182117 A | 8/2010 |

* cited by examiner

*Primary Examiner* — El Hadji Sall  
(74) *Attorney, Agent, or Firm* — Birch, Stewart, Kolasch & Birch, LLP

(57) ABSTRACT

A memory section of a server apparatus stores a security information table storing a plurality of pieces of destination management information, a trust information table storing a plurality of pieces of source management information, and a message information table storing a plurality of pieces of message information. A control section of the server apparatus, when it receives data, and if a piece of changed destination identification information is included in first destination management information that corresponds to destination data in the data, transmits a first message that depends on a trust level included in first source management information that corresponds to the source data in the data.

6 Claims, 11 Drawing Sheets

| NAME | ADDRESS | ADDRESS AFTER CHANGE (DESTINATION AFTER CHANGE) | SECURITY LEVEL |
|------|---------|------------------------------------------------|----------------|
| MR.A | AAA@ABC.COM | ABC@XYZ.COM | 3 (RETIRED ON REACHING AGE) |
| MR.B | BBB@ABC.COM | - | 4 (OTHERS) |
| MR.C | CCC@ABC.COM | CCC@ABCD.COM | 2 (MOVED TO AFFILIATED COMPANY) |
| MR.D | DDD@ABC.COM |  | 1 (MOVED BETWEEN SECTIONS) |
| MR.E | EEE@ABC.COM |  | 0 (NO CHANGE) |
| MR.F | FFF@ABC.COM |  | 0 (NO CHANGE) |

| REGISTERED ADDRESS | REGISTERED DOMAIN | TRUST LEVEL |
|---|---|---|
| | ABC.COM | 4 (COMPANY'S EMPLOYEE) |
| | ABCD.COM | 3 (AFFILIATED COMPANY'S EMPLOYEE) |
| | HAKEN.COM | 2 (TEMPORARY WORKER) |
| | TORIHIKI.COM | 1 (TRANSACTION PARTY) |
| CCC@ABCD.COM | | 4 (COMPANY'S EMPLOYEE) |
| EEE@ABC.COM | | 5 (MANAGER) |

FIG.4

| 113 | | TRUST LEVEL | | | | | |
|---|---|---|---|---|---|---|---|
| | | 0 (OTHERS) | 1 (TRANSACTION PARTY) | 2 (TEMPORARY WORKER) | 3 (AFFILIATED COMPANY'S EMPLOYEE) | 4 (COMPANY'S EMPLOYEE) | 5 (MANAGER) |
| SECURITY LEVEL | 0 (NO CHANGE) | - | - | - | - | - | - |
| | 1 (MOVED BETWEEN SECTIONS) | NOT REGISTERED. | MOVED. | MOVED BETWEEN SECTIONS. | MOVED BETWEEN SECTIONS. (TO BE NOTIFIED OF DESTINATION AFTER CHANGE) | MOVED BETWEEN SECTIONS. (TO BE NOTIFIED OF DESTINATION AFTER CHANGE) | MOVED BETWEEN SECTIONS. (TO BE NOTIFIED OF DESTINATION AFTER CHANGE) |
| | 2 (MOVED TO AFFILIATED COMPANY) | NOT REGISTERED. | MOVED. | MOVED TO AFFILIATED COMPANY. | MOVED TO AFFILIATED COMPANY. (TO BE NOTIFIED OF DESTINATION AFTER CHANGE) | MOVED TO AFFILIATED COMPANY. (TO BE NOTIFIED OF DESTINATION AFTER CHANGE) | MOVED TO AFFILIATED COMPANY. (TO BE NOTIFIED OF DESTINATION AFTER CHANGE) |
| | 3 (RETIRED ON REACHING AGE) | NOT REGISTERED. | MOVED. | RETIRED ON REACHING AGE. | RETIRED ON REACHING AGE. | RETIRED ON REACHING AGE. | RETIRED ON REACHING AGE. (TO BE NOTIFIED OF DESTINATION AFTER CHANGE) |
| | 4 (OTHERS) | NOT REGISTERED. | NOT REGISTERED. | NOT REGISTERED. | NOT REGISTERED. | NOT REGISTERED. | NOT REGISTERED DUE TO SPECIFIC REASON. |

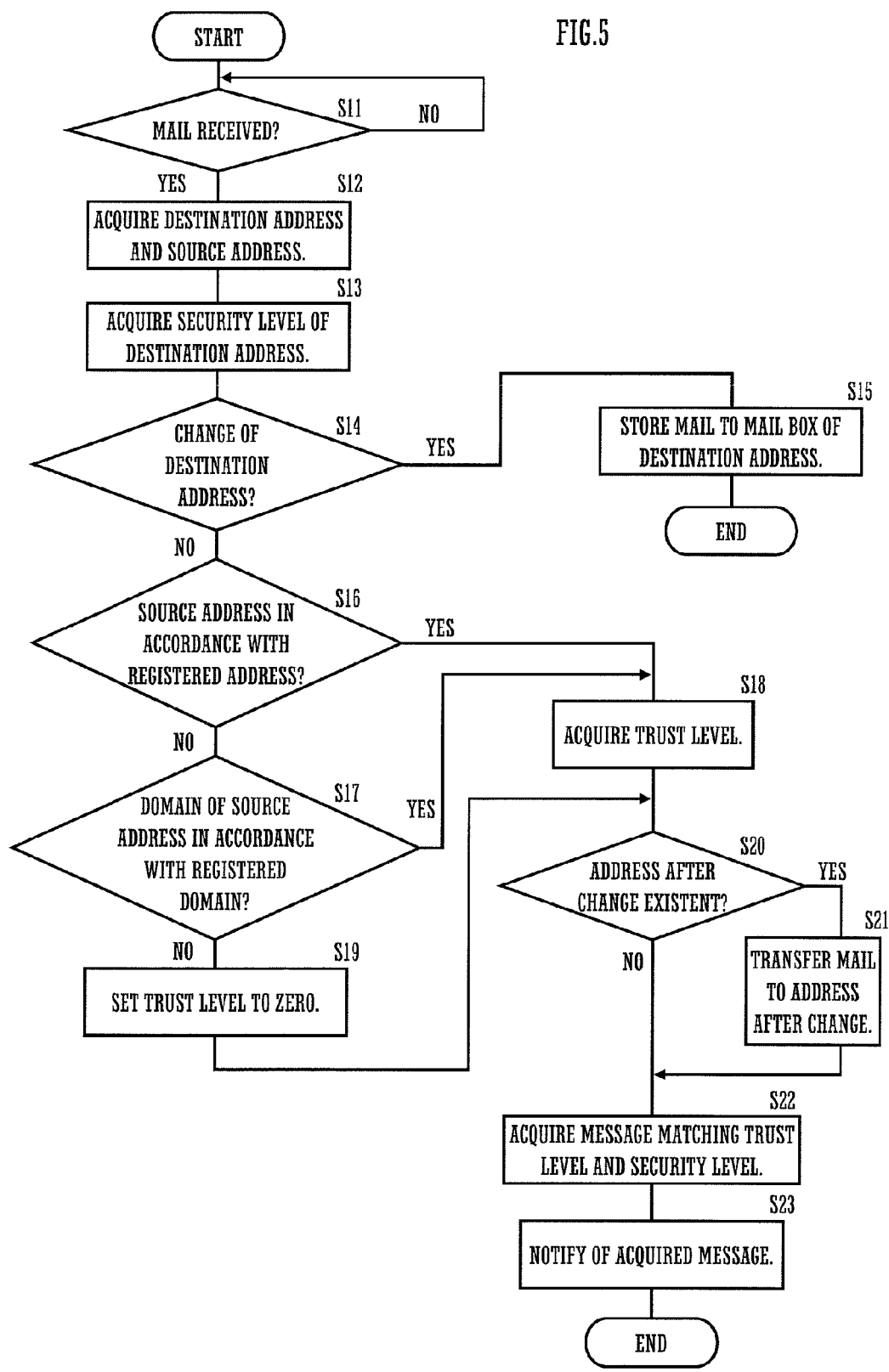

| NAME | FAX NUMBER | FAX NUMBER AFTER CHANGE (DESTINATION AFTER CHANGE) | SECURITY LEVEL |
|---|---|---|---|
| MR.A | 1234-56-7890 | 3456-78-9012 | 3 (RETIRED ON REACHING AGE) |
| MR.B | 1234-56-7890 | - | 4 (OTHERS) |
| MR.C | 1234-56-7891 | 2345-67-8901 | 2 (MOVED TO AFFILIATED COMPANY) |
| MR.D | 1234-56-7891 | 1234-56-7890 | 1 (MOVED BETWEEN SECTIONS) |
| MR.E | 1234-56-7891 | | 0 (NO CHANGE) |
| MR.F | 1234-56-7892 | | 0 (NO CHANGE) |

| REGISTERED FAX NUMBER | TRUST LEVEL |
|---|---|
| 1234-56-7890 | 4 (COMPANY'S EMPLOYEE) |
| 1234-56-7891 | 4 (COMPANY'S EMPLOYEE) |
| 1234-56-7892 | 4 (COMPANY'S EMPLOYEE) |
| 2345-67-8901 | 3 (AFFILIATED COMPANY'S EMPLOYEE) |
| 2345-67-8902 | 3 (AFFILIATED COMPANY'S EMPLOYEE) |
| 1122-33-4455 | 2 (TEMPORARY WORKER) |
| 1122-33-4456 | 2 (TEMPORARY WORKER) |
| 6677-88-99-00 | 1 (TRANSACTION PARTY) |
| 2345-67-8901 | 4 (COMPANY'S EMPLOYEE) |
| 1234-56-7891 | 5 (MANAGER) |

FIG.10

| NAME | ADDRESS | FAX NUMBER | DESTINATION AFTER CHANGE | | SECURITY LEVEL |
| --- | --- | --- | --- | --- | --- |
| | | | ADDRESS AFTER CHANGE | FAX NUMBER AFTER CHANGE | |
| MR.A | AAA@ABC.COM | 1234-56-7890 | ABC@XYZ.COM | 3456-78-9012 | 3 (RETIRED ON REACHING AGE) |
| MR.B | BBB@ABC.COM | 1234-56-7890 | - | - | 4 (OTHERS) |
| MR.C | CCC@ABC.COM | 1234-56-7891 | CCC@ABCD.COM | 2345-67-8901 | 2 (MOVED TO AFFILIATED COMPANY) |
| MR.D | DDD@ABC.COM | 1234-56-7891 | | 1234-56-7890 | 1 (MOVED BETWEEN SECTIONS) |
| MR.E | EEE@ABC.COM | 1234-56-7891 | | | 0 (NO CHANGE) |
| MR.F | FFF@ABC.COM | 1234-56-7892 | | | 0 (NO CHANGE) |

| REGISTERED ADDRESS | REGISTERED DOMAIN | REGISTERED FAX NUMBER | TRUST LEVEL |
|---|---|---|---|
| | ABC.COM | 1234-56-7890, 1234-56-7891, 1234-56-7892 | 4 (COMPANY'S EMPLOYEE) |
| | ABCD.COM | 2345-67-8901, 2345-67-8902 | 3 (AFFILIATED COMPANY'S EMPLOYEE) |
| | HAKEN.COM | 1122-33-4455, 1122-33-4456 | 2 (TEMPORARY WORKER) |
| | TORIHIKI.COM | 6677-88-99-00 | 1 (TRANSACTION PARTY) |
| CCC@ABCD.COM | | 2345-67-8901 | 4 (COMPANY'S EMPLOYEE) |
| EEE@ABC.COM | | 1234-56-7891 | 5 (MANAGER) |

112C

SERVER APPARATUS, MAIL SERVER APPARATUS AND FAX SERVER APPARATUS

CROSS REFERENCE

This Nonprovisional application claims priority under 35 U.S.C. §119(a) on Patent Application No. 2010-202937 filed in Japan on Sep. 10, 2010, the entire contents of which are hereby incorporated by reference.

BACKGROUND OF THE INVENTION

The present invention relates to a server apparatus, a mail server apparatus or a FAX server apparatus that transmits, based on identification information on an alterable destination, data received from a source to the destination.

A mail server apparatus administers at least one domain, and has a mail box for each mail address that has a domain it administers. Upon receiving an email (hereinafter, referred to as "mail"), the mail server apparatus, referring to header information of the mail, acquires a mail address of a destination of the mail. When a domain of the mail address of the destination accords with a domain the apparatus itself administers, the mail server apparatus temporarily stores the received mail in a mail box for the mail address of the destination. The temporarily stored mail is downloaded to a client apparatus, and is then referred to by a user.

Also, when an alteration of a mail address is made by a user, the mail server apparatus sets the mail address before the change (i.e., mail address from which the alteration has been made) being unable to be used (i.e., unavailable), while setting a mail address after the change (i.e., mail address to which the alteration has been made) being able to be used (i.e., available). In a case where the alteration includes an alteration of a domain, a mail server apparatus that administers the domain after the change (i.e., domain to which the alteration has been made) sets, based on the direction of the user, the mail address after the change being available.

The mail server apparatus, on receiving a mail to a mail address before the change after the alteration of the mail address has been made, returns an error-informing mail to a source of the mail (i.e., the mail sender). The error-informing mail enables the mail server apparatus to notify the source of the mail that the mail address before the change cannot be used; however, this alone does not allow the mail server apparatus to notify the source of the mail of the mail address after the change, nor of the reason why the mail address has been changed. As a result, it is necessary for a user who has changed its mail address to send to many specific users notice to the effect that its mail address has been changed. Such notice is a procedure that is troublesome for the user.

To eliminate such a troublesome procedure, among the conventional mail server apparatus is one that notifies, on receiving a mail to a mail address before the change, the source of the mail of the mail address after the change (refer to Japanese Patent Unexamined Publication No. 2001-111601 bulletin). The mail server apparatus includes a transfer information database, and registers therein a mail address after the change, associating thereof with a mail address before the change at the time of the change of the mail address.

The mail server apparatus as described in the Japanese Patent Unexamined Publication No. 2001-111601 bulletin, however, on receiving a mail to the mail address before the change, notifies any source of such mail equally of a mail address after the change. Consequently, the mail server apparatus is incapable of sending notice of a message to a user depending on each user.

Then, the present invention is directed to providing a mail server apparatus capable of sending notice of a message to a user depending on the user as a source by determining a relationship with the user beforehand.

SUMMARY OF THE INVENTION

A mail server apparatus of the present invention comprises a control section and a memory section. The memory section stores a plurality of pieces of destination management information, a plurality of pieces of source management information, and a plurality of pieces of message information;

the destination management information includes initial destination identification information, changed destination identification information that is set only when the initial destination identification information has been changed, and a security level indicating an extent to which personal information on a destination can be disclosed;

the source management information includes source identification information, and a trust level indicating a degree to which a source is allowed to obtain the personal information on a destination; and the message information includes a first message that includes a piece of personal information on a destination that depends on a trust level.

The control section, referring to the memory section on receiving data, and upon judging that a piece of changed destination identification information is included in first destination management information that corresponds to the destination data in the data, extracts, from the message information, a first message that depends on a trust level included in first source management information that corresponds to the source data in the data; and then transmits the first message, making use of the piece of changed destination identification information in the first destination management information as the destination data.

Instead of the first message, the message may be a second message that includes a piece of personal information on a destination that depends on a trust level and a security level. In such a case, the control section, referring to the memory section on receiving the data, and upon judging that a piece of changed destination identification information is included in first destination management information that corresponds to the destination data in the data, extracts, from the message information, a second message that depends on a trust level included in first source management information that corresponds to the source data in the data and a security level included in the first destination management information; and then transmits the second message, making use of the piece of changed destination identification information in the first destination management information as the destination data.

In this manner, determining in advance an extent to which personal information on a destination can be disclosed as well as a degree to which a source of the data is allowed to obtain the personal information on the destination enables the server apparatus to send notice of a message (second message) that depends on a relationship between the destination and the source.

The server apparatus can be adapted for a mail server apparatus that administers mails to mail addresses having at least one domain. In such a case, a piece of identification information is a mail address.

In this configuration, the control section, on receiving a mail, acquires from a mail header an address of a source of the mail and an address of a destination of the mail. Normally, the control section, based on the mail address of the destination, transmits the mail received from the source to the destination. Also, in a case where the mail address of the destination of the received mail has been changed, the control section transmits, to the source, either a first message that depends on a trust level of the source, or a second message that depends on both the trust level of the source and a security level of the destination.

Preferably, in this configuration, a trust level is associated with at least either one of a domain and a mail address.

With this configuration, the control section can acquire the trust level using at least either one of the domain and the mail address of the source. That is to say, the control section associates a trust level equally with a plurality of sources that have an identical domain, whereas associates a trust level with a mail address of only any source that is deemed necessary to determine its trust level individually.

As a result, since it is not required to associate a trust level with a mail address of a source individually for every address, the mail server apparatus can eliminate tasks of associating a trust level with a mail address individually for every address and in carrying out maintenance of a trust level following a change of a mail address.

The server apparatus can be adapted for a FAX server apparatus that administers FAX data addressed to at least one multifunctional apparatus. In such a case, the apparatus includes a character recognition means to perform character recognition of FAX data. The control section, on receiving FAX data, causes the character recognition means to perform character recognition of the received FAX data, and judges whether a FAX number of a destination has been changed or not, based on a result of the character recognition.

In this configuration, the control section, on receiving a FAX data, acquires a FAX number of a destination and a FAX number of a source of the FAX data. Normally, the control section, based on the FAX number of the destination, transmits the received FAX data to the destination. Further, the control section makes the character recognition means perform character recognition of the received FAX data, and thus acquires a user name of the destination. In a case where the FAX number of the destination has been changed, the control section transmits, to the source, either a message that depends on a trust level of the source, or a message that depends on both the trust level of the source and a security level of the destination.

The present invention, by means of determining in advance a degree to which a source of data is allowed to obtain personal information on a destination, makes it possible to send to a source notice of a message that depends on the source.

BRIEF DESCRIPTION OF THE DRAWINGS

FIG. 2 is a diagram showing an example of a security information table of Example 1.

FIG. 3 is a drawing showing an example of a trust information table of Example 1.

FIG. 4 is a diagram showing an example of a message information table.

FIG. 5 is a flowchart showing a mail reception process by a control section.

FIG. 7 is a diagram showing an example of a security information table of Example 2.

FIG. 8 is a diagram showing an example of a trust information table of Example 2.

FIG. 10 is a diagram showing another example of the security information table.

FIG. 11 is a diagram showing another example of the trust information table.

DETAILED DESCRIPTION OF THE INVENTION

Figure 1:
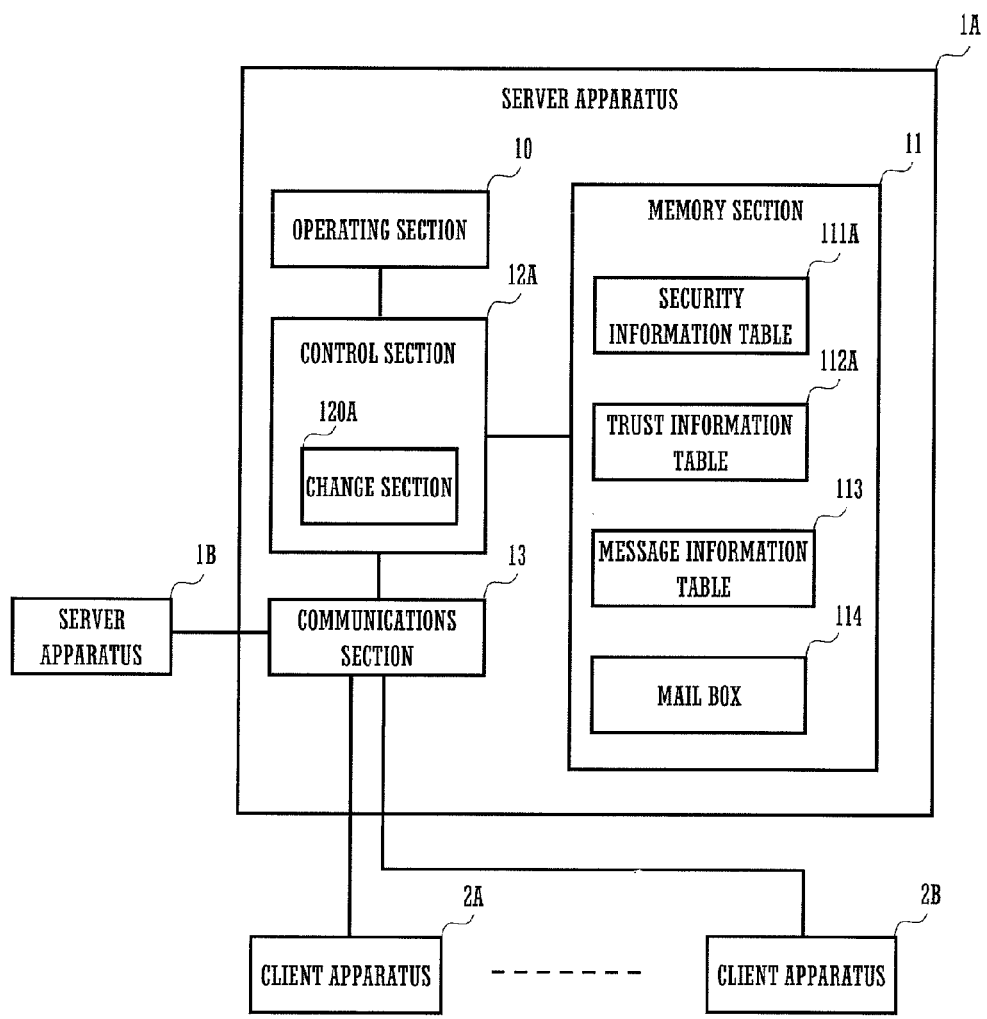
FIG. 1 is a block diagram showing a functional configuration of a server apparatus of Example 1 according to the present invention.

A server apparatus according to the present invention is explained below, referring to the drawings.

EXAMPLE 1

As shown in FIG. 1, server apparatus 1A, 1B are mail server apparatus, and any of client apparatus 2A, 2B may be a information terminal or a personal computer each capable of mail transmission and reception. The server apparatus 1A is connected to the server apparatus 1B and the client apparatus 2A, 2B through a network. Still, the numbers of the server apparatus and the client apparatus that are connected to the server apparatus 1A are not limited to one and two, respectively. The server apparatus 1A carries out transmission and reception of mails to and from the server apparatus 1B either directly or via a DNS server (not shown).

The server apparatus 1A includes an operating section 10, a memory section 11, a control section 12A and a communications section 13, and administers a domain (ABC.COM). The server apparatus 1A receives a mail to a mail address (hereinafter, simply referred to as "address") having the domain (ABC.COM), and saves it in a mail box 114.

The operating section 10 accepts operational inputs such as updating of a security information table 111A, a trust information table 112A and/or the like.

The memory section 11 includes the security information table 111A, the trust information table 112A, a message information table 113 and the mail box 114.

The security information table 111A stores a plurality of pieces of destination management information, which determine security levels of destinations. The destination management information is, as shown in FIG. 2 as an example, one in which a piece of personal information on a user who is to become a destination and a security level indicating an extent to which the personal information can be disclosed are stored, with the former being associated with the latter.

A piece of personal information includes a name, a mail address that is a piece of initial destination identification information, and a mail address after change that is a piece of changed destination identification information. The name is a title of a user who is to become a destination. The mail address is a mail address set for the user at an initial stage, having the domain (ABC.COM) that the server apparatus 1A administers. The mail address after change is a mail address after a change that is registered when a mail address has been changed due to, for instance, an assigned personnel move.

The security level is one that indicates an extent to which a piece of information on a user that is to become a destination can be disclosed. In other words, it is an indication of how important the piece of personal information is, and is determined depending on a change of the status of the user in a society and/or organization the user belongs to. In this particular example, the extent to which to protect the piece of personal information, i.e. the extent to which the personal information can be disclosed, is determined depending on the assigned move in a company the user belongs to. The greater a value of the security level is, the higher the need for protection of the personal information becomes.

The trust information table 112A, as shown in FIG. 3 as an example, stores a trust level indicating a degree to which a source of the mail is allowed to obtain a piece of personal information on a destination, with the trust level being associated with at least either one of a registered mail address and a registered domain of the user who is to become the source.

The registered mail address and the registered domain are respectively an address and a domain to be used for identifying a user who is to become a source.

The trust level is determined depending on the status of a user in a society and/or organization the user belongs to. In this particular example, a trust level is determined depending on the status of a user in the company, and hence so is a degree to which the personal information is allowed to obtain. The greater a value of the trust level is, the more important personal information one can obtain. Also, the trust level of a source that does not fall within registered addresses or registered domains is rated as zero.

The message information table 113, as shown in FIG. 4 as an example, stores messages (second messages) that depend on an extent of the security level as well as on a degree of the trust level. The message information table 113 may also store messages (first messages) that depend on a degree of the trust level, together with the second messages. Further, the message information table 113 may store the messages (first messages) that depend on a degree of the trust level, instead of the second messages.

The mail box 114 is provided per every available address, and mails to each address are saved by the control section 12A. The mails stored in the mail box 114 are downloaded to the client apparatus 2A or 2B, and are referred to by users. The mails are erased from the mail box 114 when they are downloaded to the client apparatus 2A or 2B, or after the passage of a predetermined period (such as a week, a month or the like) after they have been saved in the mail box 114.

The control section 12A includes a change section 120A. The change section 120A, depending on an operational input from the operating section 10, updates the security information table 111A and/or the trust information table 112A.

For example, when "Mr. F" enters the company, the server apparatus 1A ends up newly administering an address of "Mr. F". The control section 12A (change section 120A), rating the security level as zero (no change), adds it to the security information table 111A (the lowest line in the security information table 111A of FIG. 2), associating it with the address of "Mr. F". Additionally, when "Mr. A" retires on reaching the age, the address of "Mr. A" is changed. The control section 12A, by adding an address of "Mr. A" after the change as an address after change and changing the security level to 3 (retired on reaching the age), updates the security information table 111A (the highest line in the security information table 111A of FIG. 2). Further, for instance, when a transaction starts with a new transaction-related company, the control section 12A, rating the trust level as 1 (transaction party), adds a registered domain, with which the transaction-related company is to become a source, to the trust information table 112A.

The control section 12A performs transmission and reception of mails to and from the server apparatus 1B and the client apparatus 2A, 2B through the communications section 13.

A process flow of the control section 12A at the time of mail reception is explained referring to FIG. 5. Explained below as an exemplification is a case where the server apparatus 1A receives a mail to a destination address (AAA@ABC.COM) from a source address (CCC@ABCD.COM).

As shown in FIG. 5, the control section 12A waits until the communications section 13 receives a mail (S11: NO). Upon receiving a mail (S11: YES), the control section 12A acquires the destination address (AAA@ABC.COM) and the source address (CCC@ABCD.COM) from the header information of the mail (S12).

The control section 12A, referring to the security information table 111A, acquires a security level (3: retired on reaching the age) that is associated with the destination address (AAA@ABC.COM) (S13).

The control section 12A examines, based on the security level, whether there is a change of the destination address (AAA@ABC.COM) (S14). When the security level is zero (no change) or 1 (moved between sections) (S14: YES), the control section 12A, since there is no address change made to the destination address, saves the mail in the mail box 114 of the destination address (S15), and completes a task.

The control section 12A, since there is a change of the destination address (S14: NO), referring to the trust information table 112A, examines whether the source address (CCC@ABCD.COM) accords with any registered address (S16). The control section 12A, since the source address accords with a registered address (S16: YES), acquires a trust level (4: the company's employee) that is associated with the source address (CCC@ABCD.COM) (S18).

The control section 12A, since the address after change (AAA@XYZ.COM) is associated with the destination address (AAA@ABC.COM) (S20: YES), transfers the mail to the address after change (AAA@XYZ.COM) (S21). To be concrete, the control section 12A transmits the mail to a server apparatus administering the domain (XYZ.COM) of an address after change (AAA@XYZ.COM), causing the source address (CCC@ABCD.COM) and the destination address (AAA@XYZ.COM) to be a piece of header information.

The control section 12A, referring to the message information table 113, acquires a message that depends on the trust level and the security level (S22). The control section 12A creates a reply mail based on the acquired message, transmits it to the source address (CCC@ABCD.COM) (S23), and completes a task. The reply mail has a piece of header information including the source address (AAA@ABC.COM) and the destination address (CCC@ABCD.COM).

In a case where there is not any address after change that is associated with the destination address (S20: NO), the control section 12A proceeds to S22 without transferring the mail.

Further, when it receives a mail to the destination address (AAA@ABC.COM) from the source address (DDD@ABC.COM), the control section 12A, since the source address (DDD@ABC.COM) does not accord with any registered address (S16: NO), judges whether the domain (ABC.COM) of the source address (DDD@ABC.COM) accords with any registered domain (S17)or not. Since the domain of the source address accords with a registered domain (S17: YES), the control section 12A acquires a trust level (4: the company's employee) associated with the domain of the source address (DDD@ABC.COM) (S18), and proceeds to S20.

Moreover, when it receives a mail to the destination address (AAA@ABC.COM) from the source address (YYY@CCC.COM), the control section 12A, since the source address (YYY@CCC.COM) does not accord with any registered address (S16: NO), and since the domain (CCC.COM) of the source address (YYY@CCC.COM) does not accord with any registered domain (S17: NO), rates a trust level as zero (S19), and proceeds to S20.

In this manner, determining in advance an extent (security level) to which personal information on a destination can be disclosed as well as a degree (trust level) to which a source of the data is allowed to obtain the personal information on the destination enables the server apparatus 1A to send notice of a message that depends on a relationship between the destination and the source when an address of the destination is changed.

Also, using a registered address or a registered domain for judging a trust level of a source enables the server apparatus 1A to eliminate or reduce tasks of associating a trust level with an address of a source individually and in carrying out maintenance of a trust level following a change of an address. Besides, because the server apparatus 1A also makes it possible to associate a trust level with an address of a source individually per address, it is capable of associating an appropriate trust level with a source for which individual association is deemed necessary.

In addition, although what is notified of in the above Example 1 is a message that depends on both a security level and a trust level, a message may be one that depends only on a trust level. In such a case, the message information table 113 shown in FIG. 4 becomes a single line in security level.

EXAMPLE 2

Example 2 differs from Example 1 in that here the server apparatus 1A, 1B are FAX server apparatus, and that any of client apparatus 2A, 2B may be a FAX terminal, a multifunctional apparatus, or a personal computer each capable of FAX transmission and reception. Below, only the difference from the latter is explained.

Figure 6:
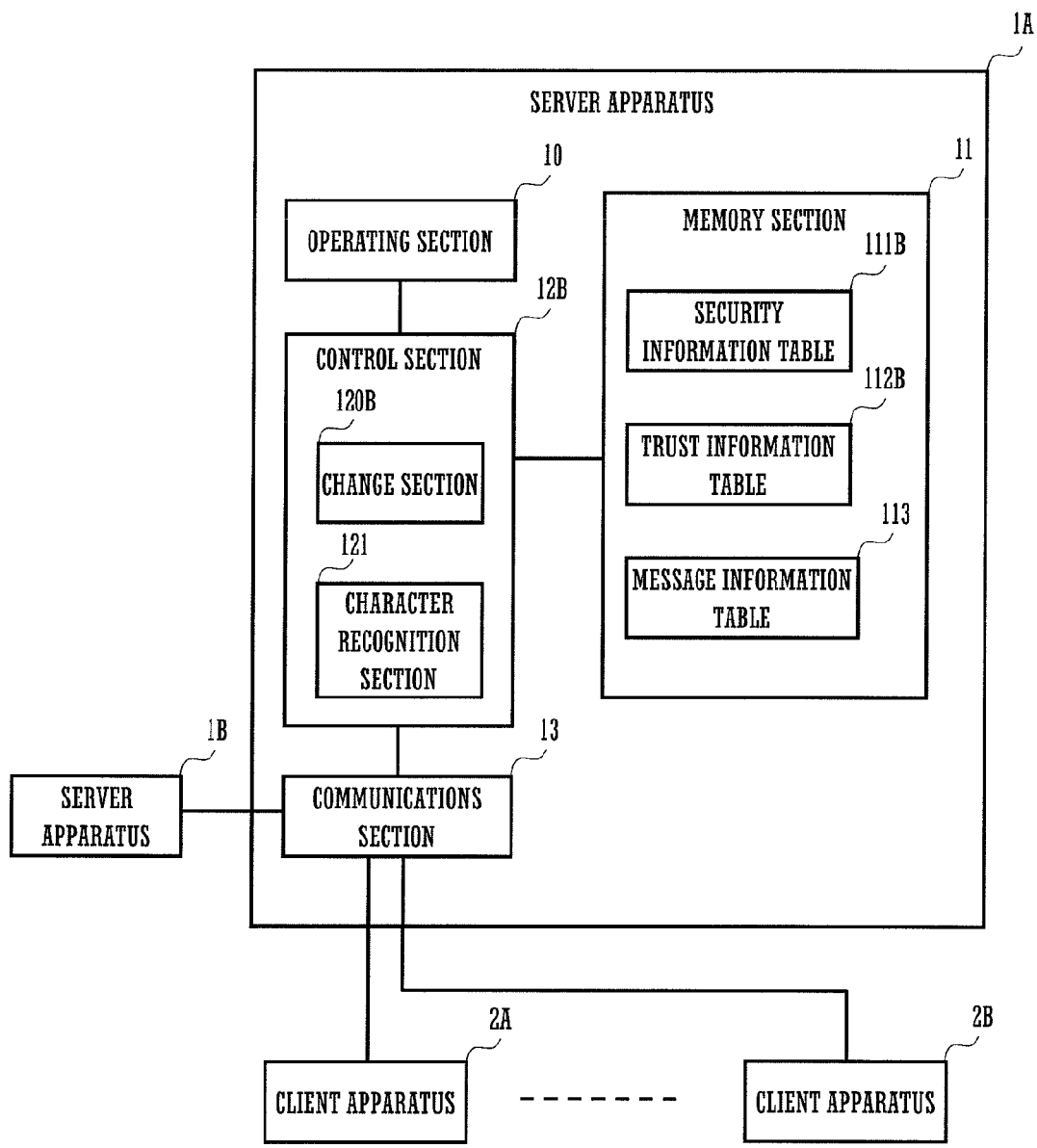
FIG. 6 is a block diagram showing a functional configuration of a server apparatus of Example 2 according to the present invention.

As shown in FIG. 6, the server apparatus 1A is connected to the server apparatus 1B and client apparatus 2A, 2B through a telephone line. Still, the numbers of the server apparatus and the client apparatus that are connected to the server apparatus 1A are not limited to one and two, respectively. Also, the server apparatus 1A may be connected to the client apparatus 2A, 2B via a network.

The server apparatus 1A includes an operating section 10, a memory section 11, a control section 12B and a communications section 13, and administers FAX data addressed to the client apparatus 2A, 2B.

The memory section 11 includes a security information table 111B, a trust information table 112B, and a message information table 113.

The security information table 111B stores a plurality of pieces of destination management information, which determine security levels of destinations. The destination management information is, as shown in FIG. 7 as an example, one in which a piece of personal information on a user who is to become a destination and a security level indicating an extent to which the personal information can be disclosed are stored, with the former being associated with the latter. A piece of personal information includes a name, a FAX number, and a FAX number after the change. The name is a designation of a user who is to become a destination. The FAX number is a departmental FAX number which the user belongs to and is set for the user at an initial stage. The FAX number after change is a FAX number after a change that is registered when a FAX number has been changed due to, for instance, an assigned personnel move.

The security level is one that indicates an extent to which a piece of information on a user that is to become a destination can be disclosed. In other words, it is an indication of how important the piece of personal information is, and is determined depending on a change of the status of the user in a society and/or organization the user belongs to.

The trust information table 112B, as shown in FIG. 8 as an example, stores a trust level being associated with a registered FAX number of a user who is to become a source. The registered FAX number is a FAX number to be used for identifying a source. Also, the trust level of a source that does not fall within registered FAX numbers is rated as zero. Under an environment where affiliated company's employees and the company's employees work together in the same floor owning one FAX number, a plurality of trust levels (3: affiliated company's employees; 4: the company's employees) are associated with one registered FAX number (2345-67-8901).

The trust level is determined depending on the status of a user in a society and/or organization the user belongs to. In this particular example, a trust level is determined depending on the status of a user in the company, and hence so is a degree to which the personal information is allowed to obtain. The greater a value of the trust level is, the more important personal information one can obtain.

A configuration of the message information table 113 is similar to the one shown in FIG. 4.

The control section 12B includes a change section 120B. The change section 120B, depending on an operational input from the operating section 10, updates the security information table 111B and/or the trust information table 112B.

For example, when "Mr. F" enters the company, the server apparatus 1A ends up newly administering a FAX number for "Mr. F". The control section 12B (change section 120B) rates the security level as zero (no change), and adds it to the security information table 111B, associating it with the FAX number for "Mr. F". Additionally, when "Mr. A" retires on reaching the age, the FAX number for "Mr. A" is changed. The control section 12B, by adding a FAX number for "Mr. A" after the change as a FAX number after change and changing the security level to 3 (retired on reaching the age), updates the security information table 111B. Further, for instance, when a transaction starts with a new transaction-related company, the control section 12B, rating the trust level as 1 (transaction party), adds a registered FAX number for the transaction-related company to the trust information table 112B.

The control section 12B includes a character recognition section 121. The character recognition section 121 performs character recognition of received FAX data. The character recognition section 121 acquires a name of a destination, for example, regarding a character string adjacent to a prefix (e.g., addressed to, Esq., or to) the name of the destination of the FAX.

Further, the control section 12B performs transmission and reception of FAX data to and from the server apparatus 1B and the client apparatus 2A, 2B through the communications section 13.

Figure 9:
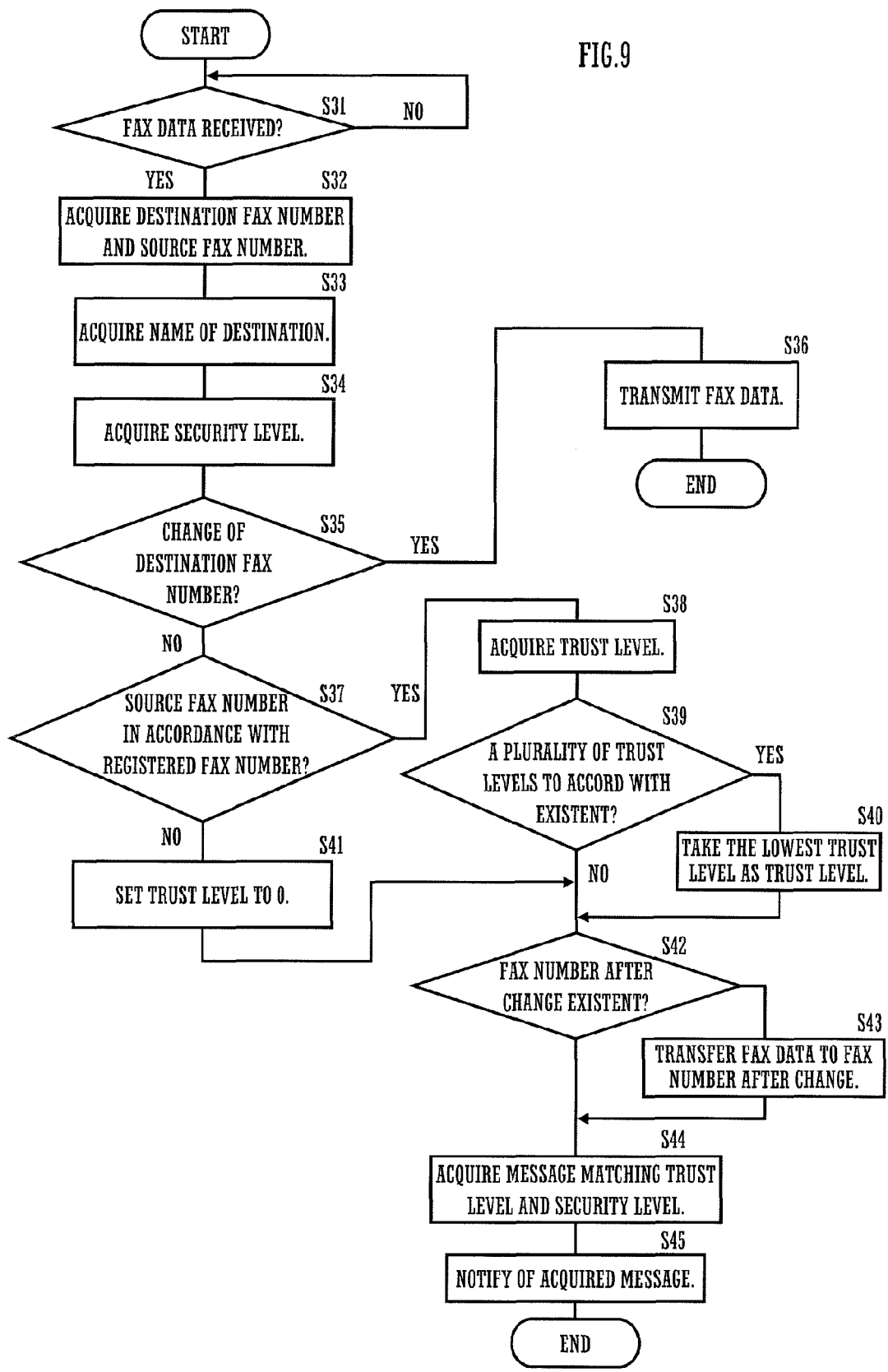
FIG. 9 is a flowchart showing a FAX reception process by a control section.

A process flow of the control section 12B at the time of FAX data reception is explained referring to FIG. 9. Explained below as an exemplification is a case where the server apparatus 1A receives FAX data to a destination FAX number (1234-56-7890) and a name "Mr. A" from a source FAX number (2345-67-8901) and a name "Mr. C".

As shown in FIG. 9, the control section 12B waits until the communications section 13 receives FAX data (S31: NO). Upon receiving the FAX data (S31: YES), the control section 12B acquires the destination FAX number (1234-56-7890) and the source FAX number (2345-67-8901) from the FAX data (S32).

The control section 12B causes the character recognition section 121 to perform character recognition of the FAX data, and then acquires the name of the destination of the FAX (S33). For example, the character recognition section 121, performing character recognition of the FAX data by the direction of the control section 12B, acquires a character string adjacent to a prefix (addressed to, Esq., or to). The control section 12B, referring to the security information table 111B, and upon judging that a name associated with the destination FAX number (1234-56-7890) accords with the character string that is acquired by the character recognition section 121, acquires the corresponding name as the name of the destination.

The control section 12B, referring to the security information table 111B, acquires a security level (3: retired on reaching the age) that is associated with the name of the destination "Mr. A" (S34), and examines whether there is a change in the destination FAX number (1234-56-7890) for the name of the destination "Mr. A" (S35). When the security level of a name of a destination "Mr. A-MOTO" is zero (no change) (S35: YES), the control section 12A, since there is no change of the destination FAX number, transmits the FAX to the destination FAX number (S36), and completes a task.

The control section 12B, since there is a change of the destination FAX number for the name of the destination "Mr. A" (S35: NO), referring to the trust information table 112B, examines whether the source FAX number (2345-67-8901) accords with any registered FAX number (S37). The control section 12B, since the source FAX number accords with a registered FAX number (S37: YES), acquires a trust level (3: affiliated company's employee; 4: the company's employee) that is associated with the source FAX number (2345-67-8901) (S38).

The control section 12B, since there are a plurality of acquired trust levels (3: affiliated company's employee; 4: the company's employee) (S39: YES), takes the lowest trust level as the trust level of the source (3: affiliated company's employee) from the acquired trust levels (3: affiliated company's employee; 4: the company's employee) (S40). If a single trust level is acquired (S39: NO), the trust level that is acquired becomes the trust level of the source.

The control section 12B examines, referring to the security information table 111B, whether a FAX number after change is associated with the name "Mr. A" of the destination (S42). The control section 12B, since the FAX number after change (3456-78-9012) is associated with the name of the destination "Mr. A" (S42: YES), transfers the FAX data to the FAX number after change (3456-78-9012) (S43). To be concrete, the control section 12B transfers the FAX data to a server apparatus administering the FAX number after change (3456-78-9012), causing the source FAX number (2345-67-8901) and the destination FAX number (3456-78-9012) to be a piece of header information.

The control section 12B, referring to the message information table 113, acquires a message that depends on the trust level and the security level (S44). The control section 12B creates a reply FAX based on the acquired message, transmits thereof to the source FAX number (2345-67-8901) (S45), and completes a task. The reply FAX has a piece of header information including the source FAX number (1234-56-7890) and the destination FAX number (2345-67-8901).

In a case where there is not any FAX number after change that is associated with the destination FAX number (S42: NO), the control section 12B proceeds to S44 without transferring the FAX data.

Further, at S37, the control section 12B, when the source FAX number does not accord with any registered FAX number (S37: NO), rates a trust level associated with the source FAX number as zero (S41), and proceeds to S42.

In this manner, determining in advance an extent (security level) to which personal information on a destination can be disclosed as well as a degree (trust level) to which a source of the data is allowed to obtain the personal information on the destination enables the server apparatus 1A to send notice of a message that depends on a relationship between the destination and the source when a FAX number of the destination is changed.

Additionally, although what is notified of in the above Example 2 is a message that depends on both a security level and a trust level, a message may be one that depends only on a trust level. In such a case, determining in advance a degree to which a source of the FAX is allowed to obtain the personal information on the destination enables the server apparatus 1A to send notice of a message that depends on the user as the source when the FAX number of the destination is changed.

In addition, in FIG. 9 in the above Example 2, when there are a plurality of acquired trust levels (S39: YES), the control section 12B takes from them the lowest trust level as the trust level of the source (S40). However, the control section 12B may cause the character recognition section 121 to perform character recognition of the FAX data, and acquire a name of the source thereby.

Further, although the server apparatus 1A is explained as being a mail server or a FAX server in the above Examples, it may be one that has functions of both a mail server and a FAX server. In such a case, the memory section 11 stores a security information table 111C as shown in FIG. 10 as an example, a trust information table 112C as shown in FIG. 11 as an example, the message information table 113 and the mail box 114. Personal information of the security information table 111C includes a name, an address, a FAX number, an address after change and a FAX number after change. The trust information table 112C stores trust levels each associated with at least one of a registered address, a registered domain and a registered FAX number.

Moreover, even when the server apparatus 1A is one that has a function of only a mail server or a FAX server as in the above mentioned Examples, it may store in its memory section 11 the security information table 111C, the trust information table 112C and the message information table 113.

The above explanation of the embodiments is nothing more than illustrative in any respect, nor should be thought of as restrictive. Scope of the present invention is indicated by claims rather than the above embodiments. Further, it is intended that all changes that are equivalent to a claim in the sense and realm of the doctrine of equivalence be included within the scope of the present invention.

What is claimed is:

1. A server apparatus connectable to a plurality of client apparatus, the server apparatus comprising:

a control section configured so as to acquire, on receiving data transmitted from a source in a situation where a client apparatus is in use among the plurality of client apparatus, source data and destination data included in the data and so as to transmit the data to a destination based on the destination data; and a memory section, wherein the memory section is configured so as to store a security information table for storing a plurality of pieces of destination management information, a trust information table for storing a plurality of pieces of source management information, and a message information table for storing a plurality of pieces of message information, wherein the destination management information includes initial destination identification information, changed destination identification information that is set only when the initial destination identification information has been changed, and a security level indicating an extent to which personal information on a destination can be disclosed;

the source management information includes source identification information, and a trust level indicating a degree to which a source is allowed to obtain the personal information on a destination;

the message information includes a first message that includes a piece of personal information on a destination that depends on a trust level; and the control section is configured in such a manner that, referring to the memory section on receiving the data and upon judging that a piece of changed destination identification information is included in first destination management information that corresponds to the destination data in the data, and then extracting, from the message information, a first message that depends on a trust level included in first source management information that corresponds to the source data in the data, it transmits the first message, making use of the piece of changed destination identification information in the first destination management information as the destination data.

2. The server apparatus as claimed in claim 1 wherein the control section includes a changing means to change the security level.

3. A server apparatus connectable to a plurality of client apparatus, the server apparatus comprising:

a control section configured so as to acquire, on receiving data transmitted from a source in a situation where a client apparatus is in use among the plurality of client apparatus, source data and destination data included in the data and so as to transmit the data to a destination based on the destination data; and a memory section, wherein the memory section is configured so as to store a security information table for storing a plurality of pieces of destination management information, a trust information table for storing a plurality of pieces of source management information, and a message information table for storing a plurality of pieces of message information, wherein the destination management information includes initial destination identification information, changed destination identification information that is set only when the initial destination identification information has been changed, and a security level indicating an extent to which personal information on a destination can be disclosed;

the source management information includes source identification information, and a trust level indicating a degree to which a source is allowed to obtain the personal information on a destination;

the message information includes a second message that includes a piece of personal information on a destination that depends on a trust level and a security level; and the control section is configured in such a manner that, referring to the memory section on receiving the data and upon judging that a piece of changed destination identification information is included in first destination management information that corresponds to the destination data in the data, and then extracting, from the message information, a second message that depends on a trust level included in first source management information that corresponds to the source data in the data and a security level included in the first destination management information, it transmits the second message, making use of the piece of changed destination identification information in the first destination management information as the destination data.

4. The server apparatus as claimed in claim 1, wherein the server apparatus is a mail server apparatus for administering mails to mail addresses having at least one domain;

the source data refer to a source mail address;

the destination data refer to a destination mail address; and the initial destination identification information, the changed destination identification information, and the source identification information respectively include a mail address.

5. The server apparatus as claimed in claim 4 wherein the source identification information included in the source management information includes a mail address and a domain.

6. The server apparatus as claimed in claim 1, wherein the server apparatus is a FAX server apparatus for administering FAX data to at least one terminal having FAX function;

the apparatus comprises a character recognition means to perform character recognition of the FAX data;

the source data refer to a source FAX number;

the destination data refer to name data on a destination; and the control section is configured in such a manner that, causing the character recognition means to perform character recognition of the received FAX data on receiving the FAX data, subsequently referring to the memory section and upon judging that a piece of changed destination identification information is included in first destination management information corresponding to the name data in the FAX data, and then extracting, from the message information, a first message that depends on a trust level included in first source management information that corresponds to the source data in the data, it transmits the first message, making use of the piece of changed destination identification information in the first destination management information as the destination data.

* * * * *